United States Patent [19]

Sunaga

[11] 4,011,585
[45] Mar. 8, 1977

[54] MAGNETIC RECORDING REPRODUCING SYSTEM

[75] Inventor: Yoshimitsu Sunaga, Tokorozawa, Japan

[73] Assignee: Pioneer Electronic Corporation, Tokyo, Japan

[22] Filed: July 11, 1975

[21] Appl. No.: 594,973

[30] Foreign Application Priority Data

July 12, 1974 Japan .................................. 49-79996
July 12, 1974 Japan .................................. 49-79998
Aug. 20, 1974 Japan .................................. 49-95378

[52] U.S. Cl. ........................ 360/25; 360/65; 360/66
[51] Int. Cl.² .................... G11B 5/45; G11B 5/008
[58] Field of Search ............... 360/25, 65, 66, 69

[56] References Cited
UNITED STATES PATENTS

| | | | |
|---|---|---|---|
| 2,791,640 | 5/1957 | Wolfe | 360/25 |
| 3,310,637 | 3/1967 | Skov | 360/65 |
| 3,368,032 | 2/1968 | Gooch | 360/66 |
| 3,436,490 | 4/1969 | Roelofs | 360/65 |
| 3,465,321 | 9/1969 | Reisfeld | 360/65 |
| 3,918,088 | 11/1975 | Tabuchi | 360/66 |

Primary Examiner—Jay P. Lucas
Attorney, Agent, or Firm—Sughrue, Rothwell, Mion, Zinn & Macpeak

[57] ABSTRACT

This invention provides a magnetic recording reproducing system which is able to obtain an optimum recording bias current for various magnetic tapes different in characteristic. The system is designed so that a reference frequency signal of a predetermined level is recorded on a magnetic tape while applying a continuously variable recording bias by use of a triangular waveform or a sawtooth waveform, whose voltage varies linearly, and means is provided to rectify and smooth the reproduced reference signal and to compare a peak value output thereof with an output obtained by suitably attenuating the peak value output and an output obtained through a peak value memory circuit so that the time when the levels of both signals coincide may be detected to stop an increase of the recording bias current, the value of which serving as the optimum recording bias current.

8 Claims, 8 Drawing Figures

MAGNETIC RECORDING REPRODUCING SYSTEM

BACKGROUND OF THE INVENTION

1. Field of the Invention

This invention relates to magnetic recording reproducing systems, and more particularly to a system which is able to provide a recording bias current optimum for various magnetic tapes different in characteristic.

2. Description of the Prior Art

Generally stated, the value of optimum recording bias current for a magnetic tape used with tape recorders or the like differs with various factors such as quality, shape, thickness of coating, and the like of a magnetic material coated on the tape. However, in order to obtain favourable recording-reproducing characteristics there is required an optimum recording bias current irrespective of the type of magnetic tape. In the past, therefore, low frequency signals (such as, for example, 400 Hz or 1 KHz) have been used to effect recording while manually varying the recording bias current, thereby providing an optimum value, that is, the most sensitive bias current which achieves the highest reproducing level or the recording bias current slightly greater than the bias as described above.

Illustrative examples of apparatus known to automatically determine the bias current are disclosed in U.S. Pat. No. 2,791,640, wherein the bias current is varied to render the frequency characteristic flat. In the apparatus disclosed in the aforesaid patent, however, the bias current determined thereby is not always optimum in value for the dynamic range and distortion factor.

SUMMARY OF THE INVENTION

In view of those disadvantages noted above, the present invention provides a magnetic recording-reproducing system which is able to automatically obtain a somewhat, greater recording bias current, when a reproducing level exceeds a maximum and decreases to a predetermined level, even for various magnetic tapes different in characteristic.

Another object of the invention is to provide a magnetic recording and reproducing system by which an optimum recording bias current for various magnetic tapes can be obtained by continuously linearly varying the recording bias current, e.g. by using a triangular or sawtooth waveform. Specifically, the period of the waveform is made long relative to the time lag between the recording of the signals onto a magnetic tape by a recording head and the reproduction of the same signals by a reproducing head.

A further object of the invention is to provide a magnetic recording reproducing system which stops the variation of the bias current only by concurrently fulfilling three conditions: that the bias current fluctuates in an increasing direction in order to prevent malfunction due to the fluctuation of dropout level or the like caused by the magnetic tape, that a recording reproducing level of reference signal has lowered from the maximum to a predetermined level, and that a recording reproducing level of reference signal is in excess of a predetermined level.

Another object of the invention is to provide a magnetic recording and reproducing system by which an optimum recording bias current and the optimum high frequency response compensation amount can be set automatically irrespective of the characteristic of the magnetic tapes used. Inasmuch as the frequency response is varied by a variation in the recording bias current, the optimum recording bias current is set first and the recording equalizer characteristic is set subsequently.

Yet another object of the invention is to provide a magnetic recording reproducing system in which periods of triangular or sawtooth waveform may be varied according to change-over of tape speeds so that the recording bias current can be determined with a minimal time in response to the respective tape speeds.

Furthermore, the present invention is directed to improve the operability of magnetic recording reproducing system, in which a position of magnetic tape having recorded thereon music sound or voices is prestored, and after completion of automatic adjustment of recording bias current and recording equalizer characteristic, the magnetic tape is automatically rewound to the aforesaid position ready for recording.

These and other objects, features and advantages of the invention will become more apparent upon a reading of the following description.

DETAILED DESCRIPTION

Figure 1:
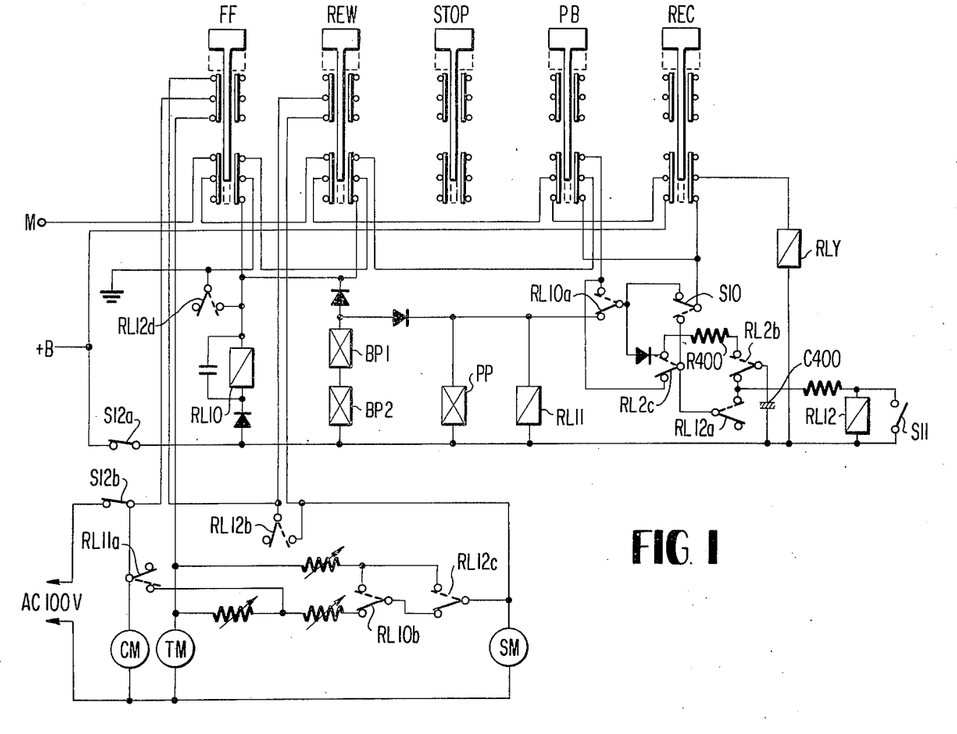
FIG. 1 is a circuit diagram showing an operating portion and a motor source supply of a magnetic recording reproducing system in accordance with the present invention.

Referring now to FIG. 1, known operating switches FF, REW, STOP PB, and REC are shown and are mechanically interconnected, these switches with the exception of STOP switch being provided with a mechanical lock and a lock releasing mechanism relative to other switches, the stop switch alone being the type of non-lock release. For example, therefore, when the PB switch is depressed to a position as indicated by the dashed line, it is locked thereat. Thereafter, when the STOP switch is depressed to a position as indicated by the dashed line, the PB switch is unlocked and returned to a position as indicated by the solid line. Since the STOP switch is of the non-lock type as described above, this switch is returned to the position as indicated at the solid line when the depressing force is released.

A positional relationship between the switches shown by the solid lines in FIG. 1 indicates a stop condition, wherein a magnetic tape 5 is attached to a tape driving device, with only shut off switches S12a and S12b turned on and a capstan motor CM rotated.

A counter switch S11 will be turned on when the indication represents 9999 (or 999 in case of three-figure indication). When a tape counter is set to 0000 (or 000), that is, when magnetic tape position is stored and switch S10 is turned on on the side as indicated by the dashed line and the operating switches REC and PLAY depressed and locked simultaneously, the present system is placed in a condition ready for recording, that is, relay RLY is turned on to close relay contact RLYa thereby applying +B power to an oscillation voltage control circuit 204 and flowing a recording bias current into a record head.

Figure 2:
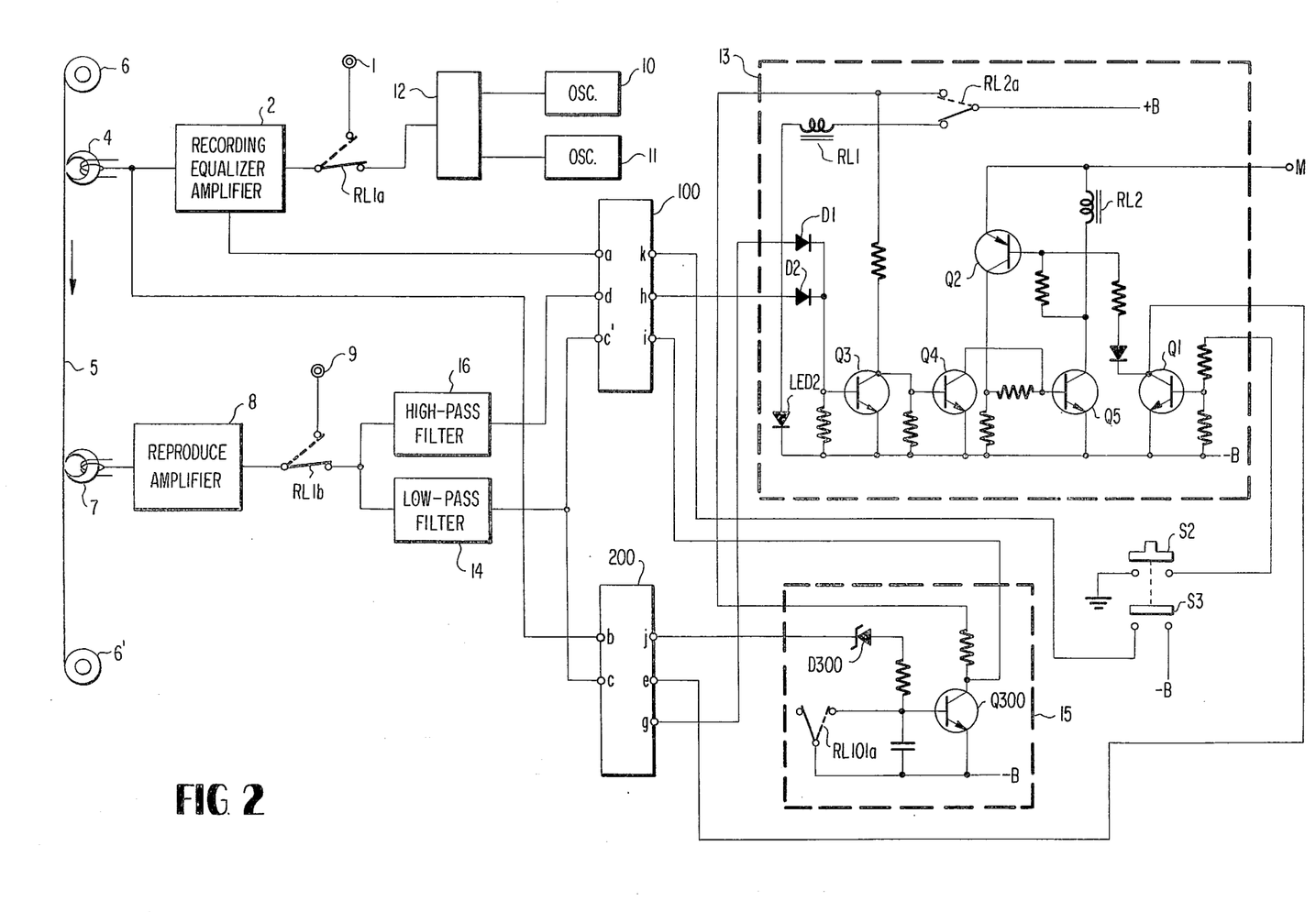
FIG. 2 is a block diagram showing automatic adjustment of a magnetic recording reproducing system of the invention.

Referring now to FIG. 2, when normally open start switches S2 and S3 are instantaneously depressed, relay RL2 is turned on and relay contacts RL 2a-2c are connected as indicated by the dashed lines to initiate operation of an automatic adjusting device. Turning now to an operating circuit of the tape driving device, when the aforesaid relay RL2 is turned on, the relay contacts RL2b and RL2c assume the positions as indicated by the dashed lines, and motor braking plungers PB1 and PB2 are magnetized to release brakes for motor TM on the taking-up side and motor SM on the supplying side, whereas relay RL11 is also turned on and relay contact RL11a then assumes the position as indicated by the dashed line, thus applying power to the motors TM and SM. A pinch roller pressing plunger PP connected parallel to the aforesaid relay RL11 is also magnetized to initiate travel of the magnetic tape 5. At the same time, capacitor C400 is charged through resistor R400. That is, when the start switches S1 and S2 are instantaneously depressed, the tape driving device changes its mode from the aforementioned condition ready for recording to a constant travelling condition to cause the constant travel of the magnetic tape.

The aforesaid automatic adjusting device will now be described in detail with reference to FIGS. 2–4.

First, a rough description will be made with respect to the normal using mode, that is, the operation of recording and reproducing signals for music sound, voices or the like.

As illustrated in FIG. 2, a signal from a record input terminal 1 is introduced through relay contact RL1a shown at the dashed line into a recording equalizer amplifier 2 and is amplified and is suitably compensated in the high frequency range therein, and then combined with a recording bias current from a recording bias oscillator 205 within a recording bias control circuit 200. The resultant signal is impressed into a record head 4 and recorded on the magnetic tape 5. This magnetic tape 5 travels in a direction as indicated by the arrow between reels 6 and 6a, and the recorded signal is reproduced by a reproduce head 7 and amplified by a reproduce amplifier 8 and is thus delivered to a reproduce output terminal 9 through the relay contact RL1b connected as shown by the dashed line.

Secondly, a description will be given with respect to the operation in the case of setting the optimum recording bias current and the optimum recording equalizer characteristic relative to a magnetic tape having a certain characteristic.

Figure 3:
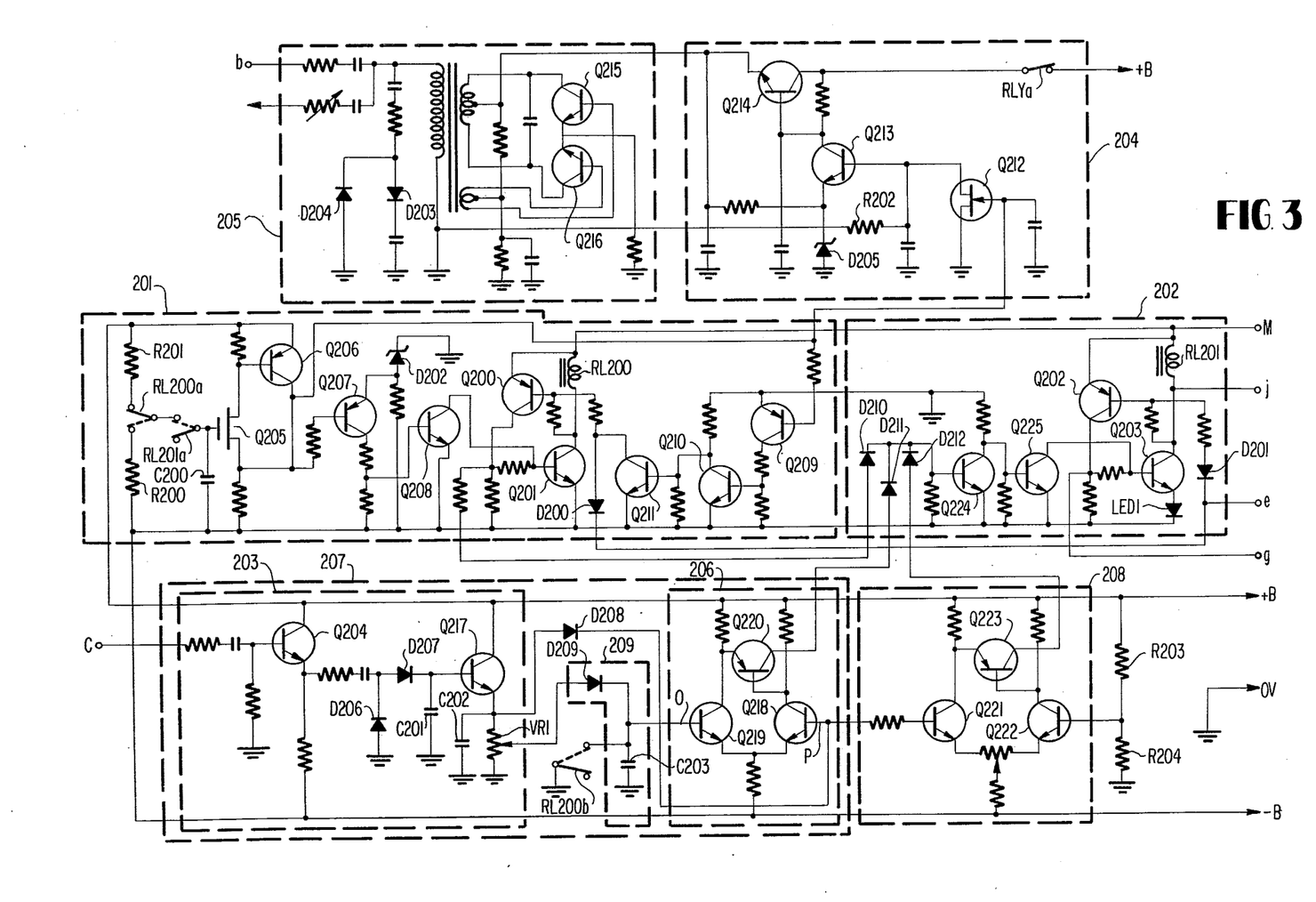
FIG. 3 is a circuit diagram showing a recording bias control circuit of a magnetic recording reproducing system of the invention.
Figure 4:
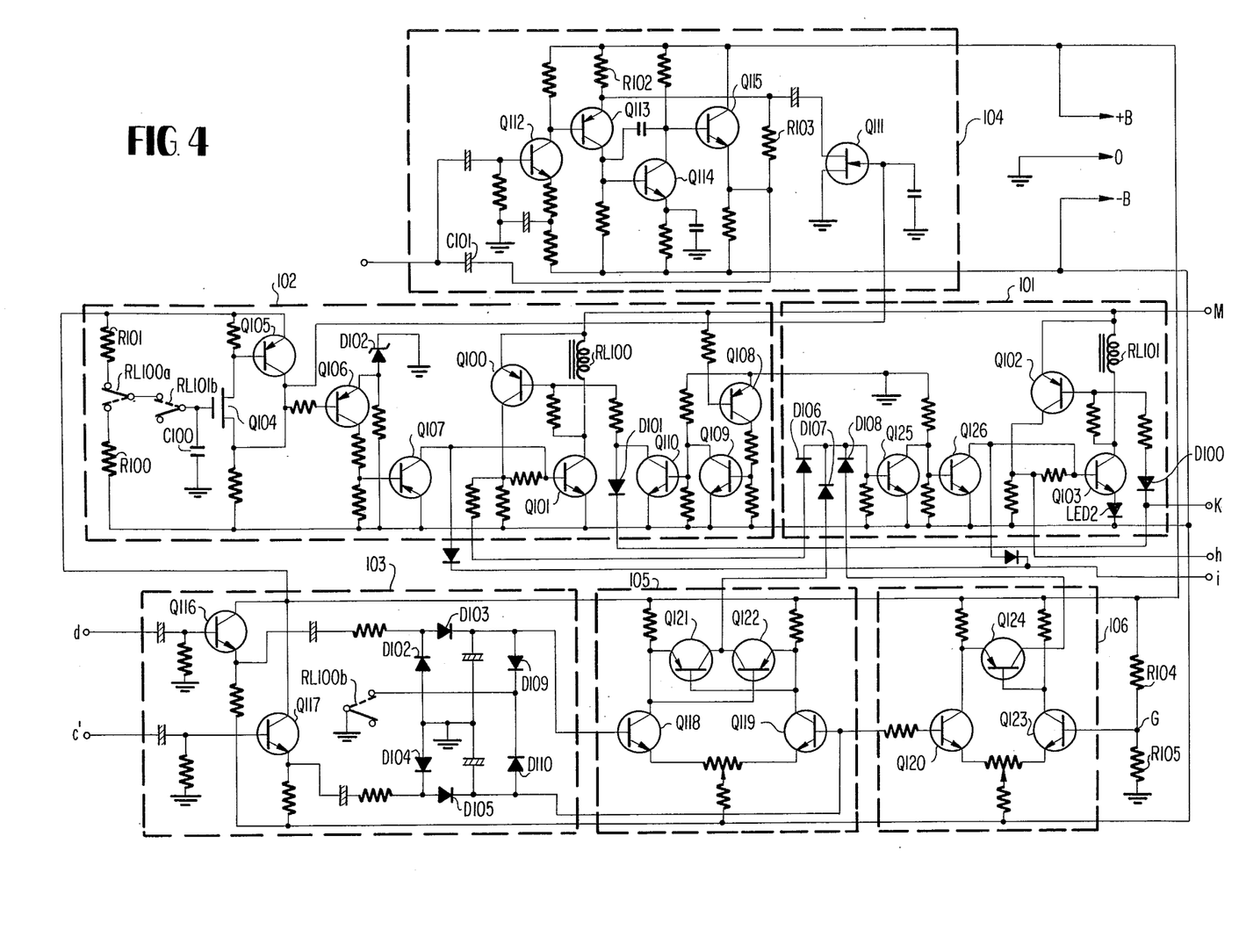
FIG. 4 is a circuit diagram showing a recording equalizer control circuit of a magnetic recording reproducing system of the invention.

Assume that the recording reproducing device is in a condition of recording and reproducing with the PB switch and REC switch simultaneously depressed, and the relay contact RLYa of the oscillation voltage control 204 shown in FIG. 3 is closed to apply power +B to the oscillation voltage control 204.

When normally open interlocking start switches S2 and S3 are instantaneously depressed, transistor Q1 in a start and stop device 13 is turned on to turn on transistors Q2 and Q5 constituting a relay hold circuit, thus turning the relay RL2 on. Thus, the relay contact RL2a is changed over to the position as indicated by the dashed line. Whereupon, the relay RL1 is turned of and relay contacts RL1a and RL1b thereof are changed over to the positions as indicated by the solid lines. At this time, a record signal to the magnetic tape 5 becomes a reference signal in the form of $f_L + f_H$ obtained by mixing signals of $f_L$ oscillator 10 and $f_H$ oscillator 11 in a mixer 12. Here, for example, the $f_L$ is 400 Hz and the $f_H$ is 10 KHz. When start switches S2 and S3 are instantaneously turned on to turn the transistor Q1 on, point e lowers to a potential level enough to turn diodes D200 and D201 on, and two relay hold circuits comprising transistors Q200 and Q201 and transistors Q202 and Q203, respectively, are turned on, that is, relays RL200 and RL201 are turned on, relay contacts RL201a, and RL200a and RL200b thereof being connected to the positions as indicated by the dashed lines. It is to be noted that the switch S3 interlocked with the aforesaid start switch S2 is provided so that when the start switch S2 is turned on to initiate operation of the recording bias control circuit 200, recording equalizer control circuit 100 is prevented from being concurrently started due to the malfunction or the like by connecting output terminal i in the recording equalizer control circuit 100 to power supply +B. Namely, when the start switches S2 and S3 are instantaneously turned on, it is assured that only the recording bias control circuit 200 is started.

This recording bias control circuit 200 will be described in detail hereinafter with reference to FIG. 3.

The reference signal $f_L + f_H$ is recorded on the magnetic tape 5, reproduced by the reproduce head 7, amplified by the reproduce amplifier 8, and via the relay contact RL1b impressed on an input terminal C of the recording bias control circuit 200. That is, the aforesaid signal is impressed on a base of transistor Q204 in a rectifier and smoothing circuit 203.

Figure 5:
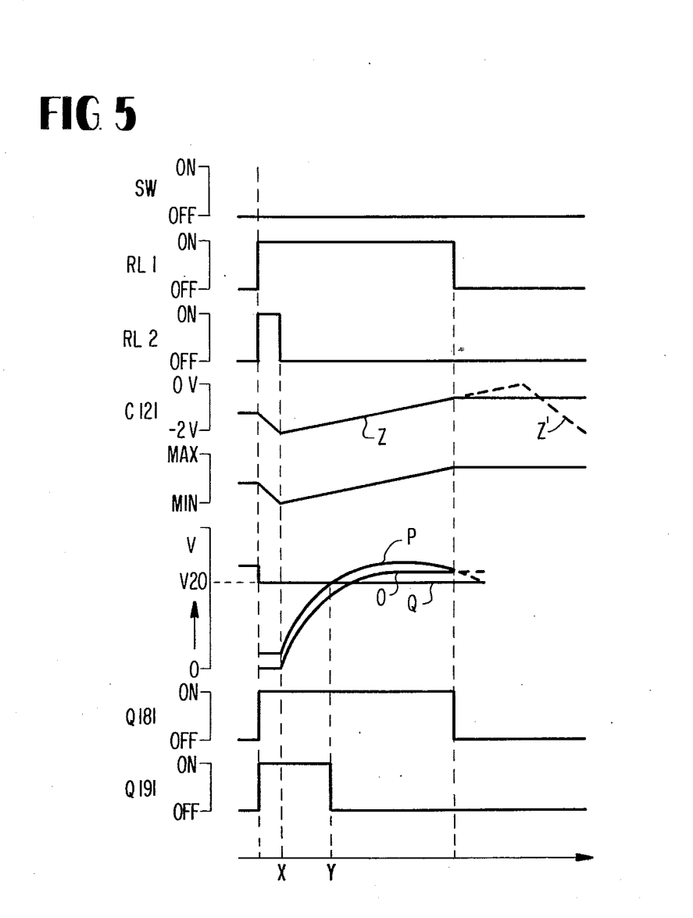
FIG. 5 is a timing chart of voltage waveforms in various portions for the purpose of assistance in explaining the operation in FIG. 3.

On the other hand, turning now to control voltage generator device 201, relay contacts RL200a and RL201a changed-over to the positions as indicated by the dashed lines simultaneously with the turning-on of diodes D200 and D201 cause capacitor C200, storing the magnetic tape characteristic as a voltage to connect to the power supply −B through resistor R200 to charge to a more negative voltage than the aforesaid stored voltage. The voltage thus charged is impedance-converted by a impedance converter circuit composed of FET Q205 and a transistor Q206, and delivered out of the collector of the transistor Q206. A portion of said voltage is impressed on a base of transistor Q207. Then, when the voltage impressed on the base of the transistor Q207, reaches $V_{Z202} + V_{BE207}$ ($V_{Z202}$ is a Zener voltage of Zener diode D202, $V_{BE207}$ is the voltage between base and emitter required to flow a collector current of the transistor Q207) the transistor Q207 is turned on and transistor Q207 is also turned on, and the relay hold circuit of the transistors Q200 and Q201 is turned off and relay RL200 also turned off. This corresponds to point X shown in FIG. 5. When the relay RL200 is turned off, the contacts RL200a and RL200b are connected as shown by the solid line and the capacitor C200 is connected through the resistor R201 to the power supply +B. Accordingly, the capacitor C200 being charged in negative voltage is forcibly discharged and approximates to zero potential. In this case, if a signal representative of stop command is not generated by the start and stop device 202, the transistor Q209 is turned off as the voltage of capacitor C200 approximates to zero, and at the same time, the transistor Q210 is turned of while the transistor Q211 is turned on, and the transistors Q200 and Q201 constituting a relay hold circuit are again turned on, that is, the relay RL200 is turned on and capacitor C200 is charged to a negative voltage to provide repeated waveforms. The change in the charging voltage of the capacitor C200 is given by Z and Z' in FIG. 5. Assume that the maximum charging voltage of the capacitor approximate to the aforementioned Zener voltage $V_{Z202}$ + $V_{BE207}$ is represented as at Ec to establish the relationship of $|Ec| \ll -B$ and $+B$. The charging voltage of capacitor C200 changes substantially linearly, and if the resistor R200 equals R201, the repeated waveforms are substantially triangular, whereas if the resistor R200 is not equal to R201, the aforesaid waveform is substantially sawtooth. Also, the value of resistors R200 and R201 or the value of capacitor C200 may be varied to thereby vary the aforementioned repeated period, i.e. frequency. If changing-over of this repeated period is carried out simultaneously with the changing-over of tape speeds, an optimum recording bias current may be determined within a minimal time in response to the tape speeds.

Further, if the relationship between the repeated period $f$ and the time T from the recording at the record head 4 to the reproducing at the reproduce head 7 is given by $f \gg T$, the error measurement by T can be maintained.

Turning now to recording bias oscillator 20 and oscillation voltage control device 204, the voltage of capacitor C200 delivered out of the collector of transistor Q206 is impressed on a gate of FETQ212 as a voltage-impedance convertor element to thereby change an impedance $R_{DS212}$ between the drain and the source of the FETQ212 and to vary the recording bias current. The mode of this operation will be described in detail. The recording bias oscillator 205 and the oscillation voltage control device 204 are paired to form one of those voltage controlled type oscillators, in which an oscillation voltage or a recording bias current being stabilized against the disturbance is fed to the magnetic head 4. This oscillation voltage is rectified by diodes D203 and D204 and shunted by resistor R202 and impedance $R_{DS212}$ between the drain and the source of FETQ212 to be impressed on a base of transistor Q213, and the voltage $V_{CE214}$ between the collector and the emitter of transistor Q214 is controlled by the ratio of reference voltage $V_{Z205}$ formed by Zener diode D205 to the voltage impressed on a base of the transistor Q213 to thereby vary an applied source voltage to a push-pull recording bias oscillator 205 composed of transistors Q215 and Q216, whereby the oscillation voltage of the recording bias oscillator 205 may be restricted. The relationship between the impedance $R_{DS212}$ between the drain and the source of FETQ212 and the gate applied voltage is given by $$R_{DS}212 = \frac{1}{\left(1 - \frac{V_{GS}}{V_p}\right)gmo}$$

where
$V_{GS}$: gate applied voltage,
$V_p$: pinch off voltage, and
$gmo$: Mutual conductance in case of $V_{GS} = 0\ V$.

It will be therefore noted that as the voltage passed to the capacitor C200 shifts from negative to zero, the impedance $R_{DS212}$ decreases, the base applied voltage to the transistor Q213 shunted by the resistor R202 and $R_{DS212}$ decreases, the collector current of the transistor Q213 decreases, the voltage $V_{CE}214$ between the collector and the emitter of the transistor Q214 also decreases, the applied power source voltage to the recording bias oscillator 205 increases, and the recording bias current increases. That is, in use, when the relay RL200, wherein the capacitor C200 is charged with negative relay voltage, is on, the recording bias current decreases, while the relay RL200, wherein the capacitor C200 is forcibly discharged toward zero potential, is off, the recording bias current increases.

A signal level detector 207 comprising a rectifier and smoothing circuit 203, a peak value memory circuit 209 and a first comparator circuit 206 will be described in detail. A reference reproduce output signal from the reproduce amplifier 8 is impressed on the rectifier and smoothing circuit 203 through the relay contact RL1b and a low-pass filter 14. That is, the input signal is obtained from the rectifier and smoothing circuit 203 through the transistor Q204, of which collector is grounded, and rectified by diodes D206 and D207 and smoothed by capacitors C201, C202 and transistor Q217. The signal obtained from the emitter terminal of the transistor Q217 is impressed on a base point P of transistor Q218, which is one input terminal of the first comparator circuit 206, through the diode D208. On the other hand, the emitter of the transistor Q217 is grounded through an attenuator VR1, and the signal obtained from the sliding terminal thereof is impressed through the diode D209 on a base point 0 of the transistor Q219, which is the other input terminal of the first comparator circuit 206. The diode D209 and the capacitor C203 constitute a peak value memory circuit 209. In this manner, the peak value output signal obtained from the emitter of the transistor Q217 is, on the one hand, impressed on the point P, and is, on the other hand, impressed on the peak value memory circuit 209 as well as the point 0 after being suitably reduced in level below the output level obtained from the emitter terminal of the transistor Q217. That is, as shown by the output waveforms at point 0 and point P in FIG. 5, as the recording bias increases, the respective output signal rises while maintaining the level difference initially set, whereas when it exceeds the peak bias, the output at point P is lowered in level due to the demagnetization effect of the recording bias field, while the output at point 0 moves in parallel while storing and holding the peak value stored in the peak value memory circuit 209 and reaches a point of intersection between the point 0 and the point P, that is, the point where both the levels coincide. This point of intersection corresponds to a point of completion of operation, that is, to the best quantity of recording bias of the magnetic tape 4. At this point of intersection, i.e., at the point where both the levels coincide, the voltages at the both collectors of transistors Q218 and Q219 the first comparator circuit also coincide, and the transistor Q220 with its base and emitter connected therebetween is turned off.

Further, a second comparator circuit 208 comprising transistors Q221 and Q222 compares the peak value output signal obtained at the point P with the reference voltage $V_{20}$ at the point Q obtained by shunting the voltage of power supply +B from the resistors R203 and R204, and if the aforesaid reproduced level is greater than the reference voltage $V_{20}$, the transistor Q223 will be turned off. This is represented as at point Y in FIG. 5.

Three gates are connected to a base of transistors Q224 in the start and stop device 202. A first gate is connected to a relay hold circuit in the control voltage generator 201 through the diode D210, a second gate is connected to the first comparator circuit 206 through the diode D211, and a third gate is connected to the second comparator circuit through the diode D212. The transistor Q224 and the three gates connected to the base thereof constitutes a NOR circuit. That is, only when these three gate inputs are all disappeared, the transistor Q224 is turned on, the transistor Q203 connected to the transistor Q225 is turned off, with the result that the hold circuit of the relay RL201 is turned off to cut off the power supply to the relay RL201 and to connect the relay contact RL201a to the side as indicated by the solid line. Accordingly, when the relay contact RL201a is open, the capacitor C200 holds the voltage immediately before the opening of the relay contact RL201a, and the recording bias current is constant in proportion to the voltage of the capacitor C200.

It is to be noted that the second comparator circuit 208 is provided to prevent mal-funciton of the present system caused by drop out, level fluctuation, etc. of the magnetic tape possibly occured when the recording bias current is small. The relay contact RL200b is an erase circuit for erasing a memory of magnetic tape characteristic previously used while recording bias current is decreased.

The luminous diode LED1 connected to the emitter of transistor Q203 in the start and stop device 202 is provided to indicate the on-state of the transistor Q203, that is, to indicate whether the present system goes on during the operation and is in a condition of operation or not.

In this manner, when the recording bias current is set to the optimum value and the relay RL201 is turned off, the point j rises to the voltage of power supply +B to turn on Zener diode D300 in a recording equalizer control starting circuit 15 and to turn transistor Q300 on. With this, the potential at point k in a recording equalizer control circuit 100 lowers to a level low enough to turn the diodes D100 and D101 on. As a consequence, two relay hold circuits comprising transistors Q100, Q101 and transistors Q102, Q103, respectively, in the recording equalizer control circuit 100 are turned on, that is, the relay RL100 and relay RL101 are brought into a on-state, and contacts RL100a and RL100b and RL101a and RL101b of the relays are connected to those sides as indicated by the dashed lines. Further, the relay contact RL101a connected to a base circuit of the transistor Q300 is connected to the side as indicated by the dashed line to thereby again turn the transistor Q300 off.

In this manner, the operation of recording equalizer control circuit 100 commences.

In the following, the recording equalizer control circuit 100 will be described in detail with reference to FIG. 4.

The mixed signal of signals from the $f_L$ oscillator 10 and $f_H$ oscillator 11 is recorded and reproduced passing through the same transmission line as that previously described, and again separated by a high-pass filter 16 and low-pass filter 14. The signals thus obtained are impressed on input terminals $c'$ and $d$, respectively, of the rectifier and smoothing circuit 103 in the recording equalizer control circuit 100.

On the other hand, turning now to control voltage generator 102, the relay contacts RL100a and RL101b changed over to those sides as indicated by the dashed lines simultaneously with the turning-on of diodes D100 and D101 cause the capacitor C100, which stores a characteristic of the magnetic tape previously used as the voltage, to connect to the power supply −B through the resistor 100, the capacitor being then charged to a voltage more negative than the aforesaid stored voltage. The voltage charged in the capacitor C100 is impedance-converted by an impedance converter circuit composed of an FETQ104 and a transistor Q105, and delivered out of collector of the transistor Q105. A portion of said voltage is impressed on the base of a transistor Q106. When the voltage impressed on the base of the transistor Q106 reaches $V_{Z102} + V_{BE106}$ ($V_{Z202}$ is a Zener voltage of Zener diode D202, $V_{BE106}$ is the voltage between base and emitter required to flow a collector current of the transistor Q106) of Zener diode D102, the transistor Q106 is turned on and transistor Q107 is also turned on, and the relay hold circuit of the transistors Q100 and Q101 is turned off and relay RL100 also turned off. This corresponds to point X shown in FIG. 6. When the relay RL 100 is turned off, the contact RL100a and RL100b are connected as shown by the solid lines and the capacitor C100 is connected through the resistor R101 to the power supply +B. Accordingly, the capacitor C100 being charged in negative voltage is forcibly discharged and approximates to zero potential. In this case, if a signal representative of stop command is not generated by the start and stop device 101, the transistor Q108 is turned off as the voltage of capacitor C100 approximates to zero, and the transistor Q109 is then turned off while the transistor Q110 is turned on, and the transistors Q100 and Q101 are again turned on, that is, the relay RL100 is turned on and capacitor C100 is charged in negative voltage to provide repeated waveforms. The change in the charging voltage of the capacitor C100 is given by Y and Y' in FIG. 6. Assume that the maximum charging voltage of the capacitor C100 approximates to the aforementioned ($V_{Z102} + V_{BE106}$) is represented as at Ec to establish the relationship of Ec <<−B and +B. The charging voltage of capacitor C100 changes substantially linearly, and if the resistor R100 equals to R101, the repeated waveforms are substantially triangular, whereas if the resistor R100 is not equal to R101, the aforesaid waveforms are substantially sawtooth. The value of resistors R100 and R101 or the value of capacitor C100 may be varied to thereby vary the aforementioned repeated period, i.e., frequency. Further, if the relationship between the repeated period $f$ and the time T from the recording at the record head 4 to the reproducing at the reproduce head 7 is given by $f>>T$, the error in measurement by T can be minimized.

Figure 7:
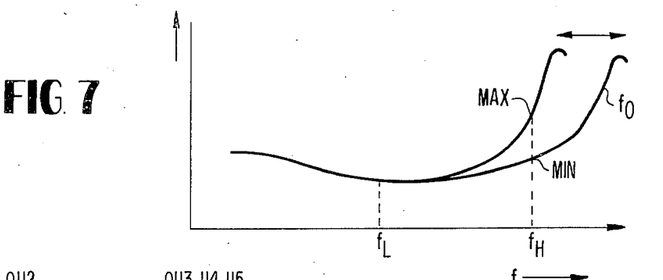
FIG. 7 is a high frequency range compensating characteristic curve of a recording equalizer amplifier 2.

Turning now to voltage variable capacitor circuit 104, the voltage of capacitor C100 delivered from the collector of transistor Q105 is impressed on a gate of FETQ111 as the voltage-impedance converter element to thereby vary the impedance $R_{DS111}$ between the drain and the source, to vary the equivalent capacity in the voltage variable capacitor circuit 104, to vary the time constant due to the resistor 501 and the equivalent capacity and the resonance frequency $fo$ due to the peaking coil L501 and the equivalent capacity, and to ideally vary the recording equalizer characteristic as shown in FIG. 7.

Figure 8:
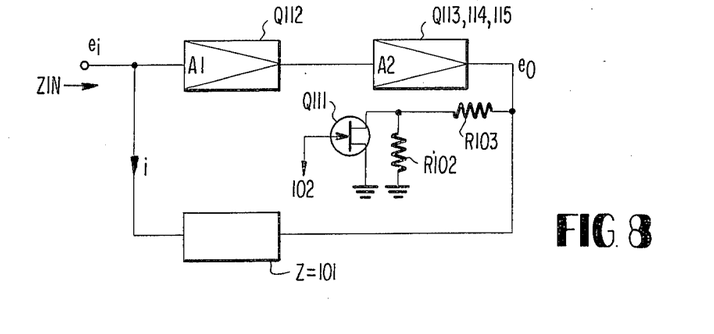
FIG. 8 is an equivalent circuit of a voltage variable capacitor circuit 104.

The voltage variable capacitor circuit 104 may be diagrammed equivalently as shown in FIG. 8. In FIG. 8, the input voltage ei is impressed on a first gainless amplifier A1 composed of a transistor Q112. The input impedance of the first amplifier A1 is so great that all of input current $i$ are passed into Z (=C101). The output voltage of the first amplifier A1 is impressed on a second amplifier A2 in the form of $-ei$ under the aforesaid condition, said second amplifier A2 comprising transistors Q113, Q114 and Q115. It is to be noted that as the second amplifier A2 is provided with sufficient negative feedback, the gain of the voltage variable capacitor circuit 104 is determined by a negative feedback loop comprising an impedance $R_{DS111}$ between the drain and the source of FETQ111 and resistors R102 and R103.

Zin may be obtained under the above-described conditions as follows: The output voltage $eo$ of the second amplifier A2 is given by $$eo = \frac{R_{DS111} // R102 + R103}{R_{DS111} // R102} (-ei)$$

if $\frac{R_{DS111} // R102 + R103}{R_{DS111} // R102}$ equals to A, $$i = \frac{ei - eo}{z} = \frac{ei + Aei}{z} = \frac{ei}{z}(1 + A)$$

Let Zin be the equivalent input impedance, $$Zin = \frac{\delta ei}{\delta i} = \frac{Z}{(1 + A)}$$

If Z equals to $$\frac{1}{j\omega C101},$$

$$Zin = \frac{1}{(1 + A)} \cdot \frac{1}{j\omega C101}$$

wherein the equivalent input impedance Zin may be varied by the amplification degree A.

This amplification degree is in turn changed by variation of the $R_{DS111}$. Also, the $R_{DS111}$ is changed by the gate applied voltage $V_{GS}$ in accordance with the following equation.

$$R_{DS111} = \frac{1}{\left(1 - \frac{V_{GS}}{V_p}\right) gmo}$$

where
 $gmo$ is the mutual inductance in case of $V_{GS} = 0$, and
 $V_p$ is the pinch off voltage.

Therefore, the equivalent input impedance Zin can be varied by varying the gate applied voltage $V_{GS}$. The voltage variable capacitor circuit 104 is operated so that when the gate applied voltage of FETQ111 is low, the equivalent capacity thereof becomes greater. That is, in a condition where the capacitor C100 is forcibly discharged, the equivalent capacity tends to increase, and the compensating quantity of recording high frequency range tends to increase.

Then, reproduce signals impressed on a high-pass filter 16 and a low-pass filter 14 are separated by both filters to form original signals $f_H$ and $f_L$, which are subjected to rectifying and smoothing in a rectifier and smoothing curcuit 103 consisting of transistors Q116, Q117 and diodes D102 - D105, the output of which is impressed on a first comparator circuit 105 and a second comparator circuit 106. Namely, the dc signal $f_H'$ of the signal $f_H$ is impressed on a base of transistor Q118 and the dc signal $f_L'$ of the signal $f_L$ on bases of transistors Q119 and Q120.

Figure 6:
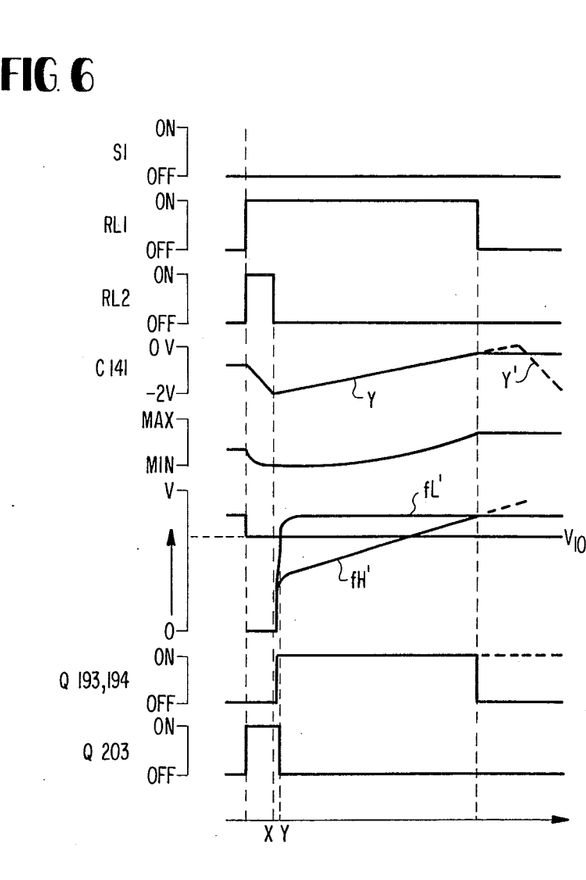
FIG. 6 is a timing chart of voltage waveforms in various portions for the purpose of assistance in explaining the operation in FIG. 4.

The compensating quantity of recording high frequency range is increased from its minimal state in the following manner. As shown in FIG. 7, a level of recording current of the low-pass frequency $f_L$ is constant, while the recording current of the high-pass frequency $f_H$ changes from its minimum toward maximum in proportion to the compensating quantity of recording high frequency range, and when the relation of $f_L' = f_H'$ is established, that is, levels of the signals come equal to each other, the transistor A121, Q122 in the first comparator circuit 105 comprising transistors Q118, Q119, Q121 and Q122 is turned off. Further, the dc signal $f_L'$ is compared, by the second comparator circuit 106 comprising transistors Q120, Q123 and Q124, with a reference voltage $V_{10}$ at point G obtained by shunting the voltage of power supply +B from the resistors R104 and R105, and if the signal $f_L'$ is found to be higher than the other, the transistor Q124 will be turned off. This corresponds to point Y as shown in FIG. 6.

Three gates are provided on a base of transistor Q125 in the start and stop device 101. A first gate is connected to a relay hold circuit in the control voltage generator 102 through the diode D106, a second gate is connected to the first comparator circuit 105, and a third gate is connected to the second comparator circuit through the diode D108. The transistor Q125 and the three gates connected to the base thereof constitutes a NOR circuit. That is, only when these three gates inputs are all disappeared, the transistor Q125 is turned off, the transistor Q126 connceted to the transistor Q125 is turned on, the transistor Q103 connected to the transistor Q126 is turned off, with the result that the hold circuit will cut off the power supply to the relay RL101, the relay contacts RL101a and RL101b of which will be connected to the sides as indicated by the solid line. Accordingly, when the relay contact RL101b is open, the capacitor C100 holds the voltage immediately before the opening of the relay contact RL101b, and the compensating quantity of recording high-frequency range is constant in proportion to the voltage of the capacitor C100.

It is to be noted that the transistors Q121 and Q122 in the first comparator circuit 105 are provided to detect the accurate equal level in a manner such that when the aforesaid level of dc signals is $f_L' > f_H'$, the transistor Q121 is turned on, and when $f_L' < f_H'$, the transistor Q122 is turned on, and is turned off only when $f_L' = f_H'$. It is to be noted that the second comparator circuit 106 is provided to prevent mal-function of the present system caused by drop out, level fluctuation, etc. of the magnetic tape. It is further noted that the relay contact RL100b is provided to short-circuit the smoothing circuit through diodes D109 and D110 in order to prevent the mal-function caused by the signals $f_L'$ and $f_H'$ of the magnetic tape previously used while the quantity of recording high-pass correction. The luminous diode LED2 connected to the emitter of transistor Q103 in the start and stop device 202 is provided to indicate the on-state of the transistor Q103, that is, to indicate whether the recording equalizer control circuit 100 goes on during the operation and is in a condition of operation or not. It will be appreciated that it may also be designed to change over values of resistors R100 and R101 in response to the action of tape speed changeover switch to obtain the same result as noted above even relative to the respective speed of tape.

In this manner, when the quantity of recording bias correction and the compensating quantity of recording high-frequency range are set to the optimum value, the start and stop circuit 202 of the recording bias control circuit 200 and the start and stop circuit 101 of the recording equalizer control circuit 100 are brought into a complete off condition, and both the diode D1 connected to the terminal g and the diode D2 connected to the terminal k are turned off and the transistor Q3 turned off. That is, the transistor Q3 detects the termination of operation of the recording bias control circuit 200 and the recording equalizer control circuit 100. This will turn on the transistor Q4 connected adjacent the transistor Q3 and turn off the transistors Q5 and Q2, which constitute a hold circuit of the relay RL2. Then, the relay RL2 is turned off whereby the relay contact RL2a is changed over to the side as indicated by the solid line. This will cut off the power supply of source +B to the start and stop circuit 202 and the control voltage generator 201 in the recording bias control circuit 200 and to the start and stop circuit 101 and the control voltage generator 102 in the recording equalizer control circuit 100, and this time, current is fed to the relay RL1 to thereby change-over the relay contacts RL1a and Rl1b to the sides as indicated by the dashed lines. This results in a state capable of performing normal recording and reproducing, of which indication is given by the luminous diode LED3 connected in series to the relay RL1, which goes on.

In this manner, when the operation of automatic adjusting device is terminated, that is, when the recording bias current and the compensating quantity of recording high-frequency range are set to their optimum value with respect to the characteristic of the magnetic tape, the aforesaid relay RL2 is turned off and the relay contacts RL2a, RL2b and RL2c connected to the sides as indicated by the solid lines to stop the operation of the automatic adjusting device, with the result that the charge charged in the capacitor C400 is discharged through the relay RL12 so that the relay RL12 is instantaneously turned on and the relay contact RL12a connected to the side as indicated by the dashed line, whereby the relay RL12 may be self-retained. Further, when the relay RL12 is turned off, the pinch roller pressing plunger as well as the relay RL11 is off, and the relay contacts 12a–d of the relay RL12 are repositioned as indicated by the dashed lines so that the tape driving device commences to rewind the magnetic tape 5.

Next, when the magnetic tape 5 is re-wound and the tape counter points 9999 (or 999) after 0000 (or 000), the counter switch S11 is turned on and the self-retained relay RL12 is turned off and thus relay contacts RL12a, RL12b, RL12c and Rl12d thereof connected to the sides as indicated by the solid lines, with the result that the magnetic tape 5 is stopped to be rewound and the tape driving device is now ready for recording. That is, the device is in a state capable of recording and reproducing music sound, voices or the like in an ordinary manner. In this state, when the pose switch S10 is turned off as indicated by the solid line, the magnetic tape travels at constant speeds, resulting in the performance of recording and reproducing having an excellent characteristic.

Thus, the system according to the present invention is designed so that the compensating quantity of recording high frequency range may be determined after the recording bias current has been determined, and hence, the optimum recording bias and recording equalizer characteristic may automatically be set even relative to the magnetic tape whatever characteristics it may have, and the maximum display of magnetic tape characteristic can be imposed.

While the invention has been described in detail and with reference to specific embodiments thereof, it will be apparent to one skilled in the art that various changes and modifications can be made therein without departing from the spirit and scope thereof.

What is claimed is:

1. A magnetic recording-reproducing system comprising: a reference signal recording means for recording the signal on a recording medium, means for reproducing the signal recorded by said recording means, a recording bias osciallator, means coupled to said oscillator for linearly varying the recording bias from a minimum toward a maximum level, means for rectifying and smoothing said reproduced reference signal to produce a first output signal, means for comparing the first output signal with a stored second output signal which is an attenuated version of the peak value of the first output signal, and coincidence means coupled to said comparing means for stopping the variation of the recording bias when the levels of said first and second output signals coincide.

2. In a magnetic recording reproducing system comprising: means for recording a reference signal while lineraly varying the magnitude of a recording bias current, means for reproducing the signal recorded by said recording means, and means for automatically stopping varying of said recording bias current according to a level of the signal reproduced by said reproducing means, the improvement comprising generator means for generating triangular waveforms or sawtooth waveforms, a recording bias oscillator coupled to said generator means for producing a recording bias current which varies in proportion to voltages of said waveforms, means coupled to said generator means for automatically stopping said generator means when the reproduced level of said reference signal decreases from its maximum to a first predetermined level, and voltage holding means for holding the voltage of the waveform when said generator means is stopped.

3. A magnetic recording reproducing system in accordance with claim 2 further comprising gate means for rendering said means for stopping said generator means operative only by fulfillment of the following conditions: the recording bias current tends to increase, said reproduced levels exceeds the maximum and decreases to the first predetermined level, and said reproduced level is greater than a second predetermined level.

4. A magnetic recording reproducing system in accordance with claim 2, in which said means for varying the recording bias current comprises a voltage variable impedance element inserted in a oscillation voltage controlling feedback loop.

5. A magnetic recording reproducing system provided with an automatic adjusting device for imparting an optimum recording bias current and a recording equalizer characteristic to a magnetic tape, the improvement comprising generator means for generating triangular or sawtooth waveforms, first circuit means for varying the recording bias current in proportion to the voltage of said triangular or sawtooth waveforms, second circuit means for varying the recording equalizer characteristic in proportion to the voltage of said triangular or sawtooth waveform, and means for storing the voltage of said triangular or sawtooth waveforms.

6. A magnetic recording reproducing system in accordance with claim 5 further comprising means for rendering operative said means for varying the recording equalizer characteristic only after the variation of the recording bias current has been terminated.

7. A magnetic recording reproducing system in accordance with claim 5 further comprising means interlocked with tape speed-changing means for changing the period of the triangular waveform or sawtooth waveform.

8. A magnetic recording reproducing system provided with an automatic adjusting device for imparting an optimum recording bias current and a recording equalizer characteristic to a magnetic tape, the improvement comprising means for generating triangular waveforms or sawtooth waveforms, means for varying the recording bias current in proportion to the voltage of said triangular waveform or sawtooth waveform, means for varying the recording equalizer characteristic in proportion to the voltage of said triangular waveform or sawtooth waveform, means for storing the voltage, and means for automatically rewinding a magnetic tape to a suitably predetermined position after the voltage has been stored to make said magnetic tape ready for recording.

* * * * *